Jan. 25, 1927.  1,615,791

J. G. FRIEMAN ET AL

DIRECTION SIGNAL DEVICE FOR VEHICLES

Filed Jan. 15, 1923    3 Sheets-Sheet 1

Witness
C. H. Wagner.

Inventor
W. A. Rankin
J. G. Frieman

Attorneys

Jan. 25, 1927. 1,615,791
J. G. FRIEMAN ET AL
DIRECTION SIGNAL DEVICE FOR VEHICLES
Filed Jan. 15, 1923    3 Sheets-Sheet 2

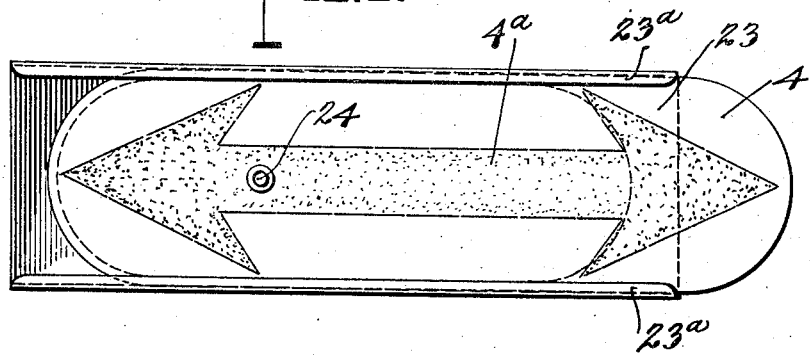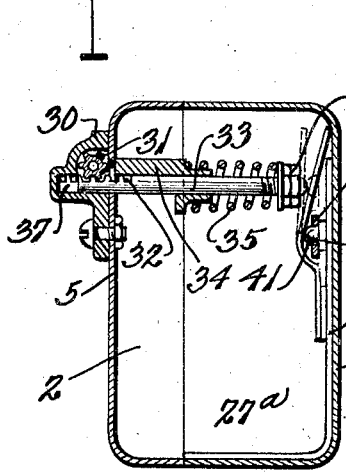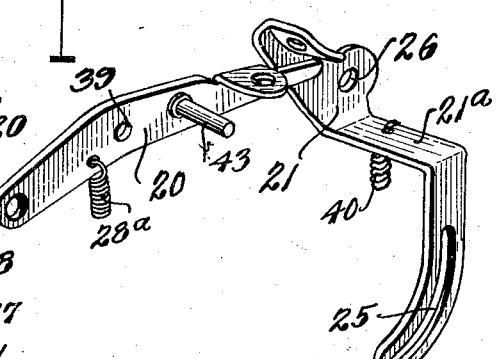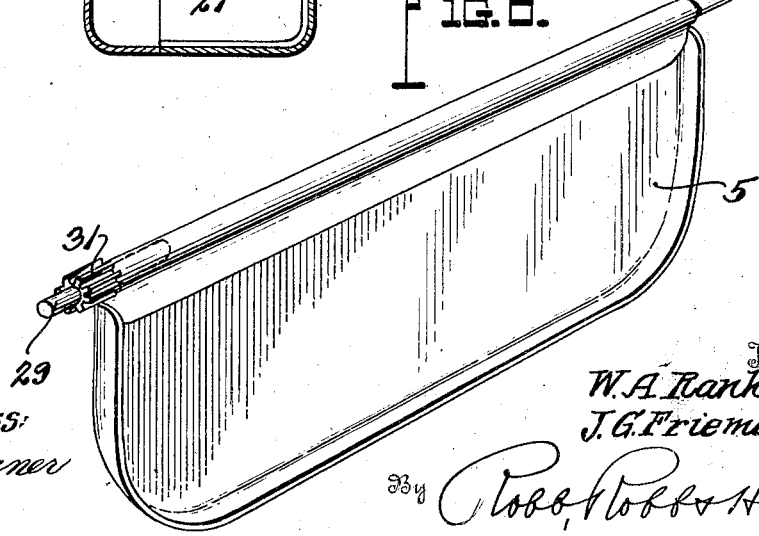

Patented Jan. 25, 1927.

1,615,791

UNITED STATES PATENT OFFICE.

JACOB G. FRIEMAN, OF ST. PAUL, MINNESOTA, AND WILLIAM A. RANKIN, OF OAK PARK, ILLINOIS; SAID RANKIN ASSIGNOR TO SAID FRIEMAN.

DIRECTION-SIGNAL DEVICE FOR VEHICLES.

Application filed January 15, 1923. Serial No. 612,860.

The present invention relates to a direction indicator for vehicles, and has for its object to provide a device of this character which embodies novel features of construction whereby it can be readily operated to signal that the driver of the vehicle is contemplating making a turn, and at the same time indicate the direction in which the contemplated turn is to be made.

A further object of the invention is to provide a direction indicating signal of this character which can be illuminated and used effectively at night and in dark places as well as by day.

The invention also contemplates a direction indicating signal which is positive and dependable in its action and which will tend to prevent accidents by conspicuously signaling to the drivers of other vehicles and also to pedestrians that a turn is about to be made, thereby enabling them to govern themselves accordingly and cooperate intelligently with the driver of the vehicle to avoid a collision or accident.

These and such other objects as may hereinafter appear are attained by the novel construction, combination and arrangement of parts to be hereinafter specifically described and claimed.

Reference will now be had to the accompanying drawings forming a part of this specification, wherein:

Figure 3 is a horizontal sectional view through the signal, looking downwardly.

Figure 4 is a vertical transverse sectional view through the signal.

Figure 5 is a detail view of the double headed arrow sign and the frame upon which it is mounted.

Figure 6 is a transverse sectional view illustrating more clearly the rack and pinion mechanism for controlling the shutter.

Figure 7 is a detail view of the shutter and sign operating levers.

Figure 8 is a detail view of the shutter.

Figure 1:
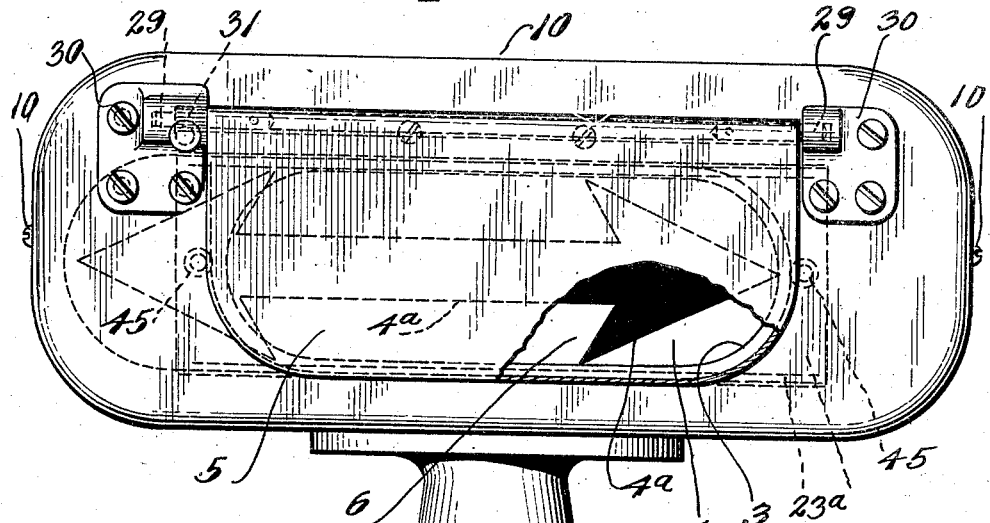
Figure 1 is a front elevation of a signal constructed in accordance with the invention, a portion of the shutter being broken away.

Referring specifically to the drawings, which illustrate one embodiment of the invention, the numeral 1 designates a shell or casing which is preferably of an elongated formation and horizontally disposed, said casing being provided with a cover 2 which closes the front thereof and which is provided with a window 3 through which the direction indicating sign 4 is displayed. A shutter 5 normally covers the window 3 but is swung upwardly to uncover the window and display the sign when it is desired to signal a contemplated turn. A piece of glass 6 or other suitable transparent material is fitted over the window 3, being clamped in position between the cover 2 and a glass retaining plate 7 which is fitted within the cover. This plate 7 is provided with an opening corresponding with the window 3 and has ears 8 stamped therefrom and pressed outwardly to engage the edge portions of the glass 6 and hold the glass against lateral movement. A peripheral flange 9 extends around the glass retaining plate 7 and may be sufficiently wide to project beyond the cover 2 and telescope within the casing 1, thereby providing a means for accurately positioning the cover upon the casing. Suitable fastening means, such as the screws 10, may be utilized for securing the flange 9 both to the casing 1 and cover 2, thereby securely connecting the cover to the casing and at the same time providing a tight joint which will exclude all dust and moisture from the interior of the casing.

The casing may be mounted in any suitable manner upon some portion of the vehicle where it can be readily seen by pedestrians and the drivers of other vehicles. As shown by the drawings, a standard 11 is provided at the bottom of the casing, said standard being hollow and formed with a flange base 11ª, by means of which it can be secured to any convenient portion of the vehicle by fastening members such as the screws 12. The interior of the standard has the lower end of a lamp base 13 anchored therein, said lamp base projecting upwardly into the casing and being provided with the electric light 14. An electric wire 15, which leads from the ungrounded terminal of the usual battery with which motor vehicles are equipped, extends upwardly through the standard and is connected to the lamp base. The standard is also provided upon the interior thereof with a downwardly opening socket 16 which receives one end of a flexible guide tube 17 through which a pair of flexible operating cables 18 and 19 pass. These cables extend upwardly into the interior of the casing 1 where they are connected, respectively, with the shutter operating lever 20 and the sign operating lever 21, as will be hereinafter more fully set forth. The other ends of the cables are connected to suitable operating elements on the vehicle whereby they may be selectively manipulated to control the signal in the desired manner. This may be done either automatically or manually, and one possible arrangement for operating the cables in the proper manner is illustrated by a copending application executed and filed of even date herewith. The lamp base 13 and guide tube 17 may be anchored or fastened within the standard by suitable set screws 22.

Arranged within the casing, immediately back of the window 3, is a guide frame 23 within which the sign 4 is slidably mounted, said sign being formed of transparent material so that it can be illuminated by the light 14. The guide frame 23 has the upper and lower edges thereof re-turned to provide the channels 23ª within which the sign 4 slides, and the body of the frame is formed with an opening which corresponds to the window 3 and through which selective portions of the indicia or characters upon the sign are displayed. The direction indicating indicia may be of any appropriate character, although it may very conveniently be in the form of a double ended arrow 4ª. By reference to Figure 5 it will be obvious that by sliding the sign back and forth, either end of the arrow can be covered or concealed while the other end of the arrow is displayed, thereby enabling a contemplated turn of the vehicle in either direction to be properly signaled by positioning the sign in an appropriate manner.

Figure 2:
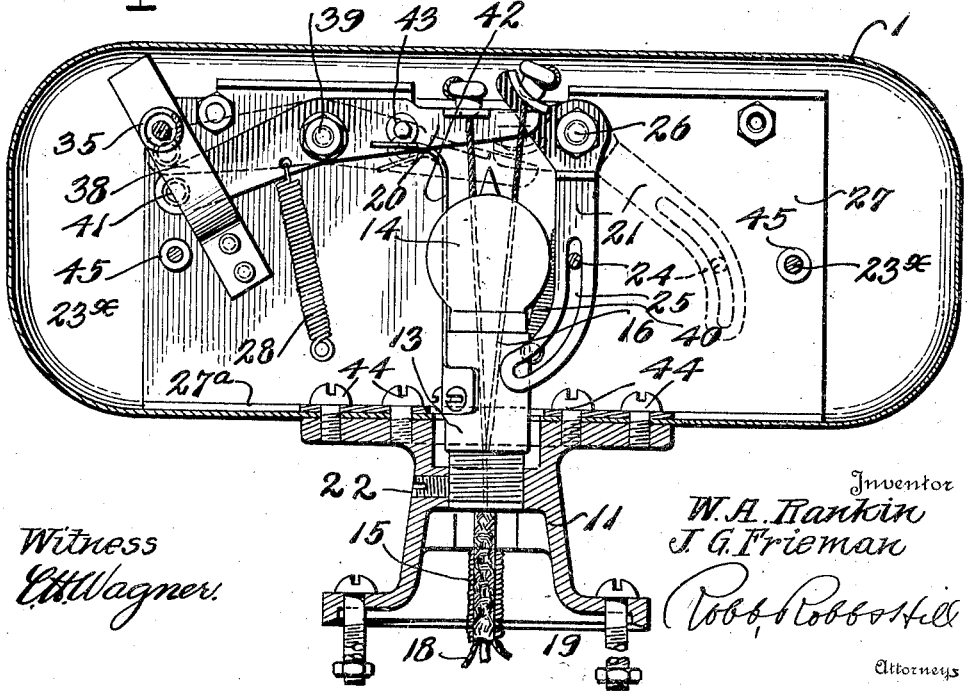
Figure 2 is a longitudinal vertical sectional view through the signal, looking toward the back thereof.

For the purpose of moving the sign 4 and positioning the same in a proper manner, a rearwardly extending arm 24 is attached thereto and this arm is received within a curved slot 25 in one end of the sign operating lever 21. This lever is pivotally mounted at 26 to a reinforcing plate 27 which is fastened in the back of the casing 1, and the slotted end of the lever is offset toward the front of the casing, as indicated at 21ª. The sign 4 is normally positioned with the arrow positioned to indicate a turn to the left, although by oscillating the lever 21 the sign can be moved within the guide frame 23 to reverse the position of the arrow and cause it to indicate a turn to the right. A spring 28 is connected to the sign operating lever 21 and normally holds the same in the full line position indicated by Figure 2, with the arm or pin 24 of the sign 4 at the upper end of the curved slot 25. The sign is then in position to indicate a turn to the left. When the lever 21 is swung into the position indicated by dotted lines on Figure 2, the position of the sign 4 is shifted so that the direction indicating indicia thereon will signal a contemplated turn to the right.

The shutter 5 is provided at its upper corners with the pintle members 29, which are pivotally engaged by the hinged elements 30. One of the pintle members 29 is provided with a pinion 31 which meshes with the teeth of a rack 32 at the forward end of a horizontally disposed plunger 33. The plunger is guided within a guide sleeve 34 which may be formed integrally with the corresponding hinge member 30 and project rearwardly therefrom, and a coil spring 35 surrounds the plunger and is interposed between the guide 34 and an abutment formed upon the end of the plunger by the nuts 36. The tension of the spring normally tends to move the plunger rearwardly and hold the shutter in a closed position, although by sliding the plunger forwardly against the action of the spring 35 the shutter may be swung upwardly into an open position so as to uncover the window and display the sign. The hinge member 30, which is provided with the rearwardly extending guide 34, may also be provided with a forwardly extending hollow portion 37 to receive the plunger upon its forward movement and assist in directing the plunger in its sliding action, as well as providing a tight housing which effectively excludes all moisture or foreign matter from this part of the mechanism.

A flexible arm 38 is mounted within the back of the casing and arranged immediately to the rear of the plunger 33 so that when the arm is flexed forwardly the plunger will be moved to swing the shutter into an open position. The flexible arm 38 is shown as mounted upon the reinforcing plate 27, and one end of the shutter operating lever 20 is movable between the reinforcing plate and the flexible arm. This lever 20 is pivotally mounted at 39 and is held yieldably in normal position with the shutter closed by means of a spring 40 which is attached to the lever. The end of the lever, which operates under the flexible arm 38, is formed with an opening loosely receiving a button 41 which is interposed between the flexible arm and the reinforcing plate and tends to relieve the lever of side thrust when it is moved. The flexible arm 38 normally assumes an inclined position, as indicated by full lines on Figure 6, so that the plunger 33 can slide rearwardly and hold the shutter in a closed position. When the shutter operating lever 20 is manipulated, the button 1 is moved upwardly between the reinforcing plate 27 and the flexible arm 38, with the result that it has a cam action upon the said arm 38 and flexes the free end thereof outwardly, as indicated by dotted lines on Figure 6. This causes the plunger 33 to be moved forwardly against the action of the spring 35 to swing the shutter 5 into an open position. The other end of the lever 20 has the flexible cable 18 connected thereto, as has been previously indicated, and it will accordingly be obvious that a pull upon this cable will result in swinging the lever, flexing the arm 38, and moving the plunger 33 forwardly to open the shutter. This end of the lever 20 also projects into the path of an outstanding lip 21ᵇ on the sign lever 21. The shutter lever 20 can thus be operated independently of the sign lever 21, although the shutter lever is always operated as a necessary incident to the operation of the sign lever. For instance, if it is desired to signal a contemplated turn to the left, it is merely necessary that the flexible cable 18 should be placed under tension. The double headed arrow 4ᵃ is normally positioned to indicate a turn to the left, and the pull upon the cable 18 merely results in opening the shutter 5 and displaying the arrow in its normal position. If a turn to the right is contemplated it is merely necessary to pull upon the other cable 19. This results in moving the sign operating lever 21 to shift the position of the double headed arrow 4ᵃ, as previously indicated, so that it will indicate a turn to the right. The necessary movement of the sign operating lever 21 causes the lip 21ᵇ thereof to engage the end of the shutter operating lever 20, so that the latter is operated as a necessary incident to the operation of the sign lever 21. The shutter is thus opened at the same time that the position of the double headed arrow sign is shifted.

It is also contemplated to provide means whereby the electric lamp 14 will be flashed or caused to burn when the shutter 5 is moved to uncover the sign, although at other times this light is extinguished. As previously mentioned, one of the terminals of the light 14 is connected in the usual manner through the socket 16 with the electric wire 15 leading from the ungrounded terminal of the battery. The other terminal of the electric light is connected to a contact arm 42 which projects upwardly from the lamp base 13 and has the extremity thereof bent laterally and disposed in the path of a contact pin 43 projecting from the lever 20. When the said shutter operating lever 20 is oscillated the pin 43 engages the arm 42 and thereby grounds the other terminal of the electric light circuit so that the electric light burns continuously when the shutter is in an open position, although the circuit is opened and the electric light extinguished when the shutter is closed. In order to facilitate the assembling of the signal devices most of the working parts are supported upon or from the back of the casing. The reinforcing plate 27 is provided at the lower edge thereof with an extension 27ᵃ which is carried forwardly over the bottom of the casing and reinforces the same at the point where it is secured to the standard 11 by the screws 44. The guide frame 23 is provided at opposite ends thereof with rearwardly extending stems 23ˣ which are slidably received within recesses formed in the extremities of posts 45 projected forwardly from the reinforcing plate 27. Springs 46, which are arranged within the bases of these recesses, engage the inner ends of the stems 23ˣ and normally tend to move the same outwardly, thereby holding the guide frame in a closed engagement with the glass retaining plate 7, and not only positioning it in the proper manner but also preventing looseness or rattling of the parts. The guide frame and sign can thus be properly assembled in operative relation with the sign operating lever 21 before the cover 2 is applied to the casing.

This direction indicator may be mounted upon either the front or the rear of a vehicle in any conspicuous place, or it may be mounted upon the front of the vehicle and used in connection with another signal at the rear end of the vehicle, such as that fully disclosed in the before-mentioned copending application filed of even date herewith. The shutter is normally closed so that the signal is inoperative, although the pull upon either of the operating cables 18 or 19 will swing the shutter into an open position and cause the sign 4 to be selectively displayed in such a manner that the indicia 4ᵃ thereon will signal to pedestrians and the drivers of other vehicles that the driver of the vehicle upon which the signal is mounted contemplates making a turn in the indicated direction. The giving of proper signals is recognized to be a factor of prime importance in the prevention of collisions and accidents, and this signal indicates not only that a turn is contemplated but also indicates the direction of the contemplated turn.

One of many possible embodiments of the invention has been illustrated and described in detail for illustration purposes, although it will be understood that many modifications and changes can be made in the various details of construction without departing in any manner from the spirit of the invention.

Having thus described our invention, what we claim as new and desire to secure by Letters Patent is:

1. A direction indicator of the character described, including a support provided with a display opening and concealing portions at opposite ends, a sign movably mounted upon the support and provided with indicia adapted to indicate a turn in either direction according to the portions thereof which are visible through the display opening, and means for selectively positioning the sign beneath said portions to conceal an end thereof.

2. A direction indicator of the character described, including a support provided with a display opening with a concealing body at each end and substantially parallel guides, a single sign slidably mounted between the parallel guides and provided with a double headed arrow, and means for selectively sliding the sign to conceal either head of the double headed arrow beneath said body and permit the other head of the arrow to be displayed in connection with the shaft of the arrow to signal a movement in the indicated direction.

3. A direction signal of the character described, including a casing provided with a display opening, a shutter normally closing the display opening, a movable sign member associated with the display opening and provided with indicia adapted to indicate a turn in either direction, and means for simultaneously opening the shutter and positioning the sign so that the indicia thereon will indicate a turn in the desired direction.

4. A direction indicator of the character described, including a casing provided with a display opening, a shutter normally closing the display opening, a sign movably mounted with relation to the display opening and provided with indicia adapted to indicate a turn in either direction according to the portions of which are displayed, and means for simultaneously opening the shutter and selectively positioning the sign to display the indicia thereon in such a manner as to indicate the proper direction.

5. A direction indicator of the character described, including a casing provided with a display opening, a shutter normally closing the display opening, a sign normally positioned to indicate a turn in one direction and adapted to be moved to indicate a turn in the opposite direction, and selectively controlled means for opening the shutter either with or without moving the sign.

6. A direction indicator of the character described, including a casing provided with a display opening, a shutter normally covering the display opening, a sign normally positioned to indicate a turn in one direction and adapted to be moved to indicate a turn in the opposite direction, sign operating means, shutter operating means independent thereof, and means whereby the shutter operating means is always operated as a necessary incident to the operation of the sign operating means.

7. A direction indicator of the character described, including a casing provided with a display opening, a shutter normally closing the display opening, a sign normally positioned to indicate a turn in one direction and adapted to be moved to indicate a turn in the opposite direction, a sign operating lever, and a shutter operating lever movable independent of the sign operating lever although a portion thereof projects into the path of the sign operating lever so that it is always operated as a necessary incident to the operation of the sign operating lever.

8. A direction indicator of the character described, including a casing provided with a display opening, a slidably mounted sign provided with indicia adapted to indicate a turn in either direction according to the portion of which is displayed through the opening, a lateral arm upon the sign, and an operating lever engaging the arm for moving the sign to selectively position the same.

9. A direction indicator of the character described, including a casing provided with a display opening, a shutter normally covering the display opening, a slidable sign provided with indicia adapted to indicate a turn in either direction according to the portion of which is displayed through the opening, an arm carried by the sign, a lever engaging the arm to selectively position the sign, and a shutter operating lever movable independently of the sign operating lever but always operable as a necessary incident to the operation of the sign operating lever.

10. A direction indicator of the character described, including a casing provided with a display opening, a shutter normally covering the display opening, a slidable sign provided with indicia adapted to indicate a turn in either direction according to the portion of which is displayed through the opening, an arm projecting from the same, a lever having a slotted end loosely receiving the arm to selectively position the sign, a shutter operating lever, and a lip upon the sign operating lever arranged to engage the shutter operating lever so that the latter is always operated as an incident to the operation of the sign operating lever.

11. A direction indicator of the character described, including a casing provided with a display opening, a shutter normally covering the display opening, a slidably mounted sign provided with indicia adapted to indicate a turn in either direction according to the portion of which is displayed through the opening, a sign operating lever for selectively positioning the sign, a shutter operating lever, independent cables connected to the two levers, and means upon the sign operating lever for engaging the shutter operating lever to move the latter as a necessary incident to movement of the sign operating lever.

12. A signal device, including a casing provided with a display opening, a swinging shutter for the display opening, a plunger operatively connected to the shutter, and a shutter operating member movable in a direction transverse to the axis of the plunger to apply a longitudinal pressure upon the plunger to slide the same.

13. A signal device, including a casing provided with a display opening, a shutter for the display opening, a shutter operating plunger, yielding means normally holding the plunger in inoperative position, and cam means engaging the rear end of the plunger to slide the same into operative position.

14. A signal device, including a casing provided with a display opening, a shutter for the display opening, a normally spring retracted shutter operating plunger, a transversely disposed strip engaging the end of the plunger, and cam means acting upon the strip to slide the plunger into operative position.

15. A signal device, including a casing provided with a display opening, a shutter for the display opening, a normally retracted shutter operating plunger, a transverse strip at the end of the plunger, a shutter operating lever, and means controlled by the lever for moving the strip to slide the plunger into operative position.

16. A signal device, including a casing provided with a display opening, a shutter for the display opening, a normally retracted shutter operating plunger, a transverse strip at the end of the plunger, a shutter operating lever, and a button upon the lever having a cam engagement with the strip to actuate the plunger.

17. A signal device, including a casing provided with a display opening, a shutter for the display opening, a plunger having a rack and pinion connection with the shutter, and a shutter operating lever having an operative connection with the plunger.

18. A signal device, including a casing provided with a display opening, a swinging shutter, hinge members for the shutter, one of which is formed with guides, a shutter operating plunger slidably mounted within the guides and connected with the shutter pivot and means for actuating the plunger.

19. A signal device, including a casing provided with a display opening, a swinging shutter for the opening, hinge members for the swinging shutter, one of which is provided with a guide, a plunger mounted within the guide and having a rack pinion connection with the shutter, and a shutter operating lever operatively connected with the plunger.

20. A signal device, including a casing provided with a display opening, a shutter, a normally retracted shutter operating plunger, a transverse strip at the end of the plunger, a shutter operating lever, a button carried loosely by the lever and engaging the strip, and a backing upon which the button slides whereby it has a cam action to move the strip and slide the plunger.

21. A signal device, including a casing provided with a removable cover, a frame separate from the cover and held against the same, and means for supporting the frame from the back of the casing.

22. A signal device, including a casing provided with a removable cover, a sign receiving frame separate from the cover and held against the same, and means for supporting the frame from the back of the casing and holding it yieldably in position against the cover.

23. A signal device, including a casing provided with a removable cover, a sign receiving frame separate from the cover and held thereagainst, posts projecting from the back of the casing, and members carried by the frame and having a telescoping engagement with the posts to support the frame in position.

24. A signal device, including a casing provided with a removable cover, a sign receiving frame held against the cover and separate therefrom, posts projecting from the back of the casing, members projecting from the frame and slidably engaging the posts, and yielding means associated with the same members for holding the frame in a yieldable engagement with the cover.

In testimony whereof we affix our signatures.

JACOB G. FRIEMAN.
WILLIAM A. RANKIN.